US006871353B2

United States Patent
Odagiri

(10) Patent No.: US 6,871,353 B2
(45) Date of Patent: Mar. 22, 2005

(54) RECORDING MEDIUM CARTRIDGE

(75) Inventor: Hirokazu Odagiri, Miyagi (JP)

(73) Assignee: Sony Corporation, Tokyo (JP)

( * ) Notice: Subject to any disclaimer, the term of this patent is extended or adjusted under 35 U.S.C. 154(b) by 77 days.

(21) Appl. No.: 10/312,467

(22) PCT Filed: Apr. 24, 2002

(86) PCT No.: PCT/JP02/04098
§ 371 (c)(1),
(2), (4) Date: Jun. 6, 2003

(87) PCT Pub. No.: WO02/089138
PCT Pub. Date: Nov. 7, 2002

(65) Prior Publication Data
US 2004/0013081 A1 Jan. 22, 2004

(30) Foreign Application Priority Data
Apr. 27, 2001 (JP) ........................................ 2001-132386

(51) Int. Cl.[7] .............................................. G11B 23/03
(52) U.S. Cl. ...................................... 720/726; 360/133
(58) Field of Search ................................ 360/132, 133; 369/291; 428/206; 206/459.5

(56) References Cited

U.S. PATENT DOCUMENTS

| 4,388,362 A | * | 6/1983 | Iwata et al. | ................. 503/200 |
| 4,898,849 A | * | 2/1990 | Kang | ......................... 503/214 |
| 5,436,059 A | * | 7/1995 | Kano | ....................... 428/195.1 |
| 5,799,008 A | * | 8/1998 | Kano et al. | ................. 369/291 |

FOREIGN PATENT DOCUMENTS

| JP | 06-111536 | 4/1994 | |
| JP | 2000-242175 | 9/2000 | |
| JP | 2001026031 A | * 1/2001 | ........... B29C/45/00 |

* cited by examiner

Primary Examiner—David Davis
(74) Attorney, Agent, or Firm—Sonnenschein, Nath & Rosenthal LLP

(57) ABSTRACT

A recording medium cartridge which is capable of preventing a drop in aesthetic quality by preventing damage to a printed layer for writing during ultrasonic welding is presented. As a printed layer (20), a writing-enabling filler (21), and resin particles (22) having an average particle diameter equal to or greater than the average particle diameter of the writing-enabling filler (21) mentioned above are included in an ink (23). The resin particles (22) come into contact with a welding horn (9), and prevent the writing-enabling filler (21) from falling out or changing shape due to ultrasonic vibration.

6 Claims, 5 Drawing Sheets

RECORDING MEDIUM CARTRIDGE

BACKGROUND OF THE INVENTION

The present invention relates to a recording medium cartridge housing, for example, an optical disk or a magneto-optical disk as a recording medium enabling recording/reproduction of information such as audio signals, image signals and the like, and relates more specifically to a recording medium cartridge comprising a printed layer which enables writing on the main surface of the cartridge body.

Currently, recording media for recording/reproducing music and images are widely prevalent in general. Of these media, a small disk cartridge referred to as a MiniDisc™ (MD) is widely used not only indoors but outdoors as well as in vehicles. This disk cartridge is made, as shown in FIG. 6, by rotatably housing an optical disk or a magneto-optical disk 4 inside a cartridge body 3 made by assembling an upper half 1 and a lower half 2 through ultrasonic welding. When not in use, a shutter 5 blocks an opening in the cartridge body 3, and adhesion of foreign material to the disk 4 is thus prevented.

Ordinarily, titles of the songs recorded on the disk cartridge are written on a label sticker to be stuck on a main surface 3a of the cartridge body 3. However, there is a possibility that the sticker would come off as the adhesiveness deteriorates due to changes over time, and as a result that the disk cartridge may become unejectable from a recording/reproducing apparatus (deck).

In order to solve this, there are products in which a printed layer 8, which makes writing possible, is provided on the main surface 3a of the cartridge body 3 instead of the label sticker mentioned above. The conventional printed layer 8 comprises an ink 7 containing a writing-enabling filler 6, such as calcium carbonate, silica, protein powder, which makes writing possible. The filler 6 forms appropriate bumps and dents on the surface of the printed layer 8, and thus achieves writability. Also, since the filler 6 has water absorbing properties, writing with water-based ink is made possible.

However, because the printed layer 8 containing the filler 6 is vulnerable to rubbing and friction, there is a problem in that it brings about a drop in aesthetic quality as the printed layer 8 is grazed and marred due to pressure welding between a welding horn 9 and the upper half 1 as shown in FIG. 8 at the time of ultrasonic welding of the upper and lower halves 1 and 2 in a step for manufacturing the disk cartridge. In other words, there is a problem in that by being subjected to ultrasonic vibration in a state where the writing-enabling filler 6 in the printed layer 8 and the welding horn 9 are in contact, the filler 6 falls out from the ink 7 or changes shape, thereby bringing about a drop in the aesthetic quality of the printed layer 8 and ultimately of the disk cartridge.

The present invention is proposed in view of the problems mentioned above, and makes it its issue to provide a recording medium cartridge capable of preventing a drop in aesthetic quality by preventing damage to the printed layer for writing during ultrasonic welding.

SUMMARY OF THE INVENTION

In solving the problems mentioned above, the recording medium cartridge of the present invention is characterized in that a writable printed layer printed on a main surface of a cartridge body comprises resin particles having an average particle diameter greater than or equal to the average particle diameter of a writing-enabling filler.

In the present invention, by bringing the resin particles having an average diameter greater than or equal to the average particle diameter of the writing-enabling filler in contact with a welding horn, ultrasonic vibration from the welding horn is received by the resin particles mentioned above. Thus, the falling out of the writing-enabling filler from ink is avoided, and a drop in the aesthetic quality of the printed layer is prevented.

DETAILED DESCRIPTION OF THE PRESENTLY PREFERRED EMBODIMENTS

Below, modes for carrying out the present invention are explained with reference to the drawings. In the present mode, explanations are given with the disk cartridge for MiniDiscs™ (MDs) mentioned above taken as an example of a recording medium cartridge.

Figure 1:
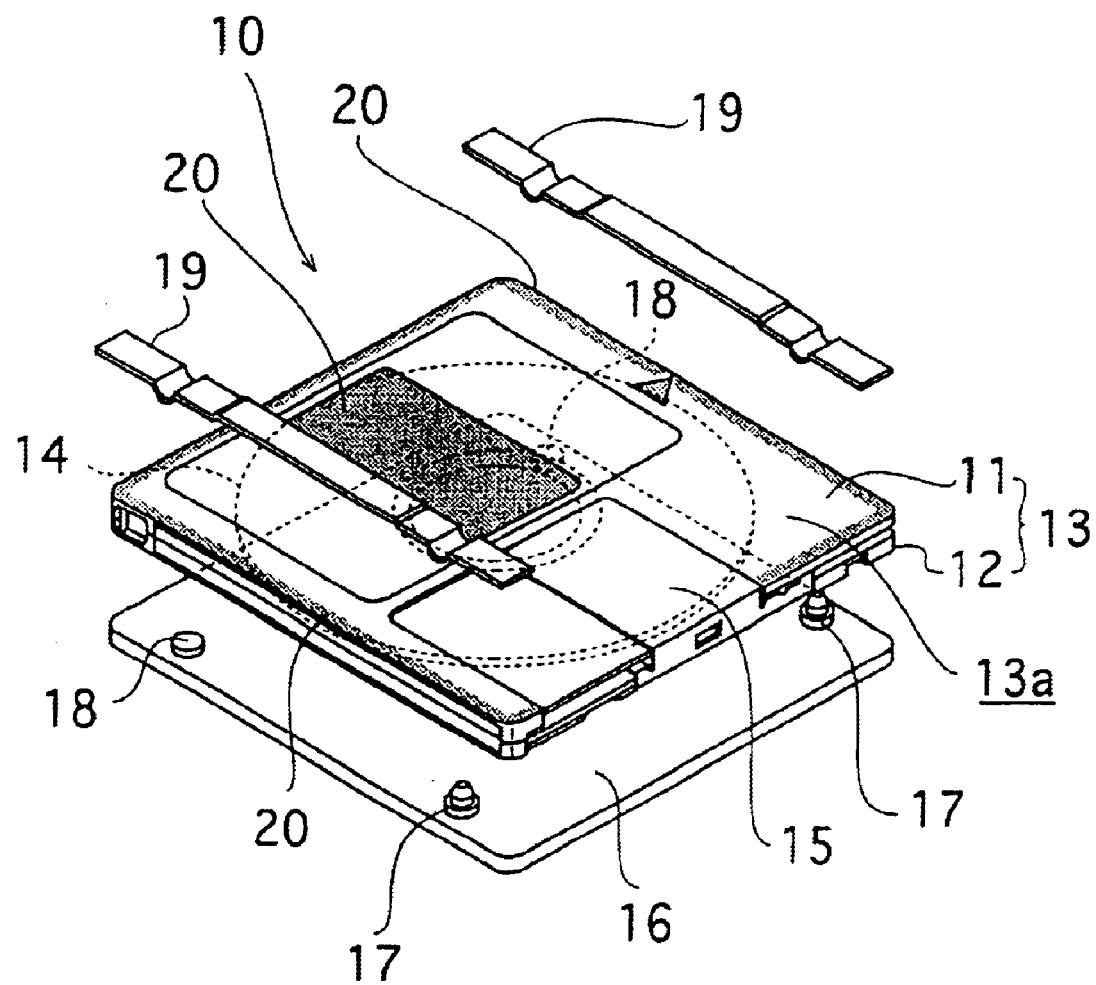
FIG. 1 is a perspective view illustrating the configuration of a disk cartridge as a recording medium cartridge according to a mode for carrying out the present invention, and the relationship between the disk cartridge mentioned above, a reference table of the recording/reproducing apparatus and pressure springs.

A disk cartridge 10 according to the present mode is made by, as shown in FIG. 1, constructing a cartridge body 13 by combining an upper half 11 and a lower half 12 comprising a synthetic resin material, and by rotatably housing a magneto-optical disk (hereinafter referred to as a disk) 14 as a recording medium inside this cartridge body 13. Further, a shutter 15 which can be opened and closed is provided in the cartridge body 13, and when not in use, the shutter 15 blocks an opening in the cartridge body 13, thereby preventing adhesion and so forth of foreign material to the disk 14.

The disk cartridge 10, when inserted in a recording/reproducing apparatus, has the shutter 15 opened, while reference holes not shown in drawing in the lower half 12 are engaged by a pair of reference pins 17, 17 of a reference table 16 on the recording/reproducing apparatus side, the lower surface of the lower half 12 is placed on a pair of receiving sections 18, 18 of the reference table 16, and the disk cartridge is thus supported horizontally. Further, the outer edge portions of the upper surface of the upper half 11 elastically contact a pair of pressure springs 19, 19, and the disk cartridge 10 is thus held.

In a state where the disk cartridge 10 is thus held, the disk 14 is held to a disk table not shown in drawing with a chuck, and is driven to rotate by a spindle motor. Further, recording/reproducing operations are performed by an optical head or a magnetic head facing the disk 14 through the opening from which the shutter 15 is removed.

On the other hand, a printed layer 20 according to the present invention is provided in the outer edge portion or approximately the center portion of the main surface 13a (the upper surface of the upper half 11) of the cartridge body 13.

Figure 2:
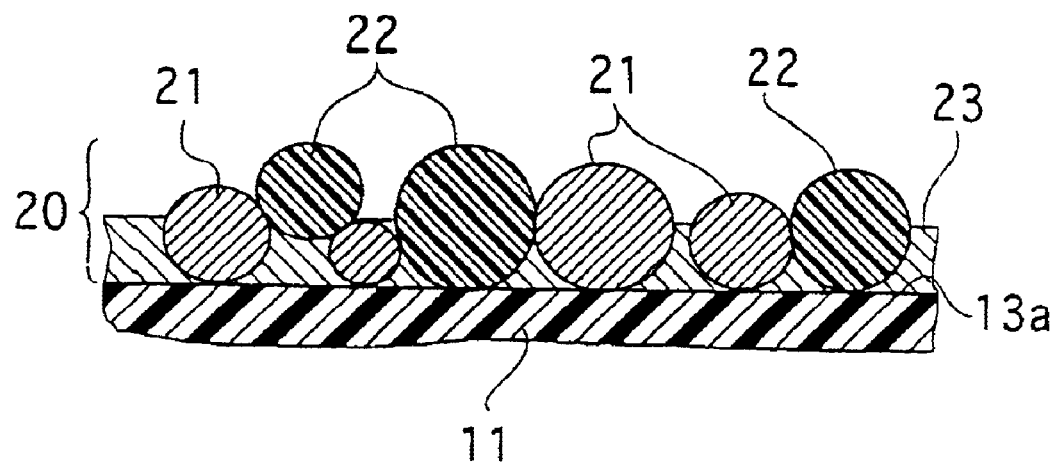
FIG. 2 is a sectional view schematically illustrating the configuration of the printed layer which is printed on a main surface of a cartridge body of the same disk cartridge.

The printed layer 20 mainly comprises, as shown in FIG. 2, a medium constituting an ink 23, a writing-enabling filler 21 which is contained in the ink 23 and makes writing possible, and resin particles 22 which are contained in the ink 23 and have an average particle diameter greater than or equal to the average diameter of the writing-enabling filler 21.

For the medium, a product in which vinyl chloride/acrylic resin or the like is used as a binder, and to which a diluting solvent or adjuvant is added is used. For the writing-enabling filler 21, generally, porous particles such as calcium carbonate and silica are employed for ink receiving effects, but protein powder of pulverized ox-hide may also be included for the purpose of further increasing water absorbance.

Next, for the resin particles 22, polyurethane resin whose modulus of bending elasticity is 98 MPa or above and 980 MPa or below (1000~10000 kgf/cm$^2$), and whose average particle diameter is 10 $\mu$m is used. Because the average diameter of the writing-enabling filler 21 mentioned above is smaller than or equal to 10 $\mu$m, resin particles of a larger or equal average diameter are employed.

For the particle diameter of the resin particles 22, 5 $\mu$m above and 20 $\mu$m or below are optimal. If the particle diameter of the resin particles 22 is smaller than 5 $\mu$m, they become buried between the writing-enabling filler 21, and adequate effects cannot be achieved. Also, when the particle diameter of the resin particles 22 is greater than 20 $\mu$m, not only is it impossible to pass through the mesh of a screen, but the difference in height between the writing-enabling filler 21 becomes greater and writability is comprised.

In addition, as the printing method for the printed layer 20, a silk-screen method employing a stencil printing plate of approximately 180~250 mesh (mesh indicates the size of the mesh per inch) is optimal. In this case, the thickness of the ink 23 formed is approximately 5 $\mu$m~10 $\mu$m.

In addition, the optimal content ratio for the resin particles 22 is 3 weight parts or above and 10 weight parts or below. At 2 weight parts or below, there is not enough resin particles 22, and vibrations from a welding horn cannot be received adequately. Further, in the case of the present mode, the upper limit of the content ratio of the resin particles 22 is 10 weight parts. In order to obtain the desired writability for the printed layer 20, approximately 20 weight parts of the writing-enabling filler 21 has to be added, but for the ink, it is preferable that the total filler (components other than the medium and solvent) not exceed 30 weight parts, and if it does, the durability of the ink drops considerably, and inferior adhesion occurs between itself and the base material. Therefore, it is undesirable that the upper limit of the content ratio of the resin particles 22 exceed 10 weight parts.

On the other hand, in the present mode, the printed layer 20 is constructed not only as a printed layer for writing, but also as a vibration absorbing layer for suppressing the vibration of the cartridge body 13 inside the recording/reproducing apparatus.

In general, with respect to a disk cartridge in operation for recording/reproducing, vibration accompanying high-speed rotation of the spindle motor and the like on the recording/reproducing apparatus side is relayed to the cartridge body 13 from the reference pins 17, 17 of the reference table 16 and the receiving sections 18, 18. At the same time, vibration is relayed to the cartridge body 13 from the pressure springs 19, 19. The fact that the cartridge body 13 vibrates also affects, in no small part, the disk 14 in a rotating motion, and leads to the occurrence of axial run-out. For this reason, when the disk 14 vibrates, signals read by the optical head also changes, and this in turn affects the reproduced waveforms of audio signals and the like, and as a result, there are adverse effects in that high-fidelity reproduction is not performed.

In the present mode, because the resin particles 22 constituting the printed layer 20 has an average particle diameter of 10 $\mu$m, and is relatively soft with a modulus of bending elasticity of 98~980 MPa, vibration absorbing effects are manifested, and it becomes possible to attenuate the vibration of the cartridge body 13. In other words, when vibration is relayed to the printed layer 20, the resin particles 22 vibrate, and vibrational energy is converted into heat energy, thereby attenuating vibration.

Figure 3:
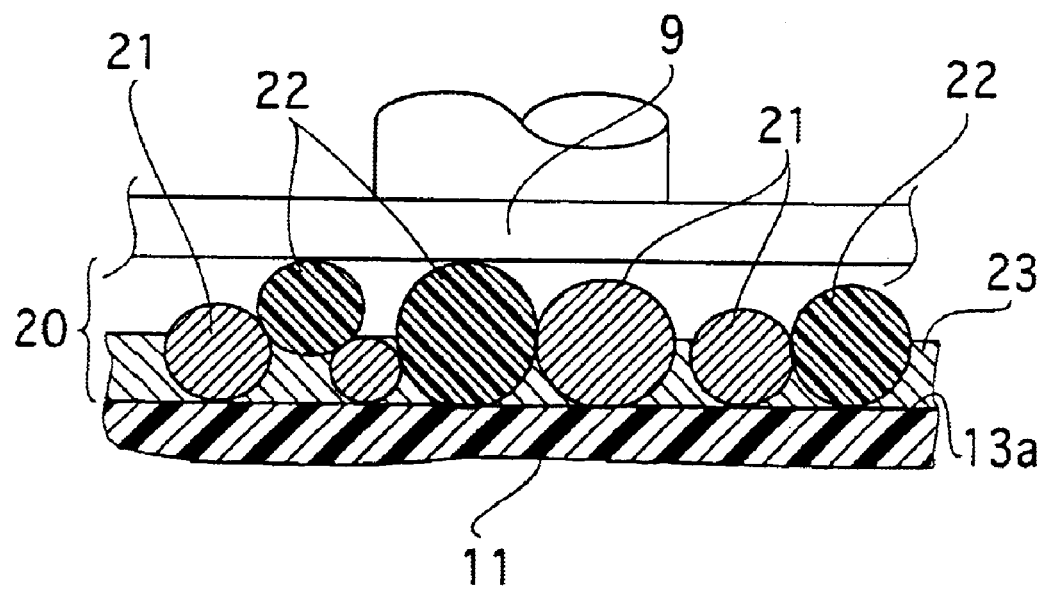
FIG. 3 is a diagram explaining the relationship between the printed layer mentioned above and a welding horn during ultrasonic welding.

According to the disk cartridge 10 of the present mode thus constructed, because the resin particles 22, which have a large average particle diameter, in the printed layer 20 come into contact with the welding born 9 when the upper half 11 and the lower half 12 are welded ultrasonically by, as shown in FIG. 3, pressure-welding the welding horn 9 of an ultrasonic welder onto the upper surface of the upper half 11 (the main surface 13a), direct contact between the writing-enabling filler 21 and the welding horn 9 is avoided. Therefore, the falling out of the writing-enabling filler 21 from the ink 23 or its changing shape is avoided by having the resin particles 22 receive the ultrasonic vibration from the welding horn 9. As a result, a drop in the aesthetic quality of the printed layer 20 and ultimately the disk cartridge 10 is prevented.

In addition, according to the present mode, because the printed layer 20 is also used as a vibration-absorbing layer, the vibration of the cartridge body 13 inside the recording/reproducing apparatus is reduced, and high-fidelity reproduction operations may be achieved.

An experiment for studying the extent of damage to the printed layer 20 during ultrasonic welding was conducted, in which the printed layer 20 was formed with the composition indicated below.

<Composition of the Printed Layer>

Medium: 70 weight parts

Protein powder: 8 weight parts

Calcium carbonate: 10 weight parts

Silica: 3 weight parts

Solvent: 5 weight parts

Resin particles: 4 weight parts

In the experiment, polyurethane particles A having a modulus of bending elasticity of 68.6 MPa, polyurethane particles B having a modulus of bending elasticity of 98 MPa, polyurethane particles C having a modulus of bending elasticity of 980 MPa, butadiene particles having a modulus of bending elasticity of 686 MPa, acrylic particles A having a modulus of bending elasticity of 1372 MPa and acrylic particles B having a modulus of bending elasticity of 3136 MPa were used for the resin particles 22, and for each, the number of samples in which damage appeared on the surface of the printed layer 20 during ultrasonic welding to an extent that they were found aesthetically defective was studied.

The average particle diameter of the resin particles 22 was made 10 μm for all particles. Also, the average particle diameter of the writing-enabling filler (calcium carbonate, silica and protein powder) mentioned above is 10 μm or below. Experiment results are shown in table 1. The number of trails (cartridges) was set at 10.

In addition, the ultrasonic welding conditions are similar to conventional conditions, where the pressure is 196 kPa, the vibration frequency is 20 kHz (vertical vibration), the application duration is 0.28 seconds and the retention time after ultrasonic vibration is stopped is approximately 0.1 seconds.

TABLE 1

| Material | Poly-urethane A | Poly-urethane B | Poly-urethane C | Buta-diene | Acrylic A | Acrylic B | Conven-tionally |
|---|---|---|---|---|---|---|---|
| Modulus of bending elasticity MPa | 68.6 | 98 | 980 | 686 | 1372 | 3136 | — |
| (kgf/cm²) | (700) | (1000) | (10000) | (7000) | (14000) | (32000) | — |
| Number damaged | 8/10 | 0/10 | 0/10 | 0/10 | 4/10 | 10/10 | 10/10 |

From table 1, in cases where the conventional printed layer which does not contain resin particles and where the acrylic particles B having a modulus of bending elasticity of 3136 MPa were employed, damage was found in all of the 10 samples. In particular, in the samples containing acrylic particles, not only was there damage to the writing-enabling filler, but the acrylic particles themselves were also separated from the printed layer.

A tendency for the amount of damage to decrease as the modulus of elasticity becomes smaller was indicated, and at 98~980 MPa, no damage was found. On the other hand, with urethane resin particles of which the modulus of elasticity is below 98 MPa, damage to the printed layer was found again. It is inferred that this is because the resin particles are too soft, and ultrasonic vibration is directly relayed to the writing-enabling filler particles.

Figure 4:
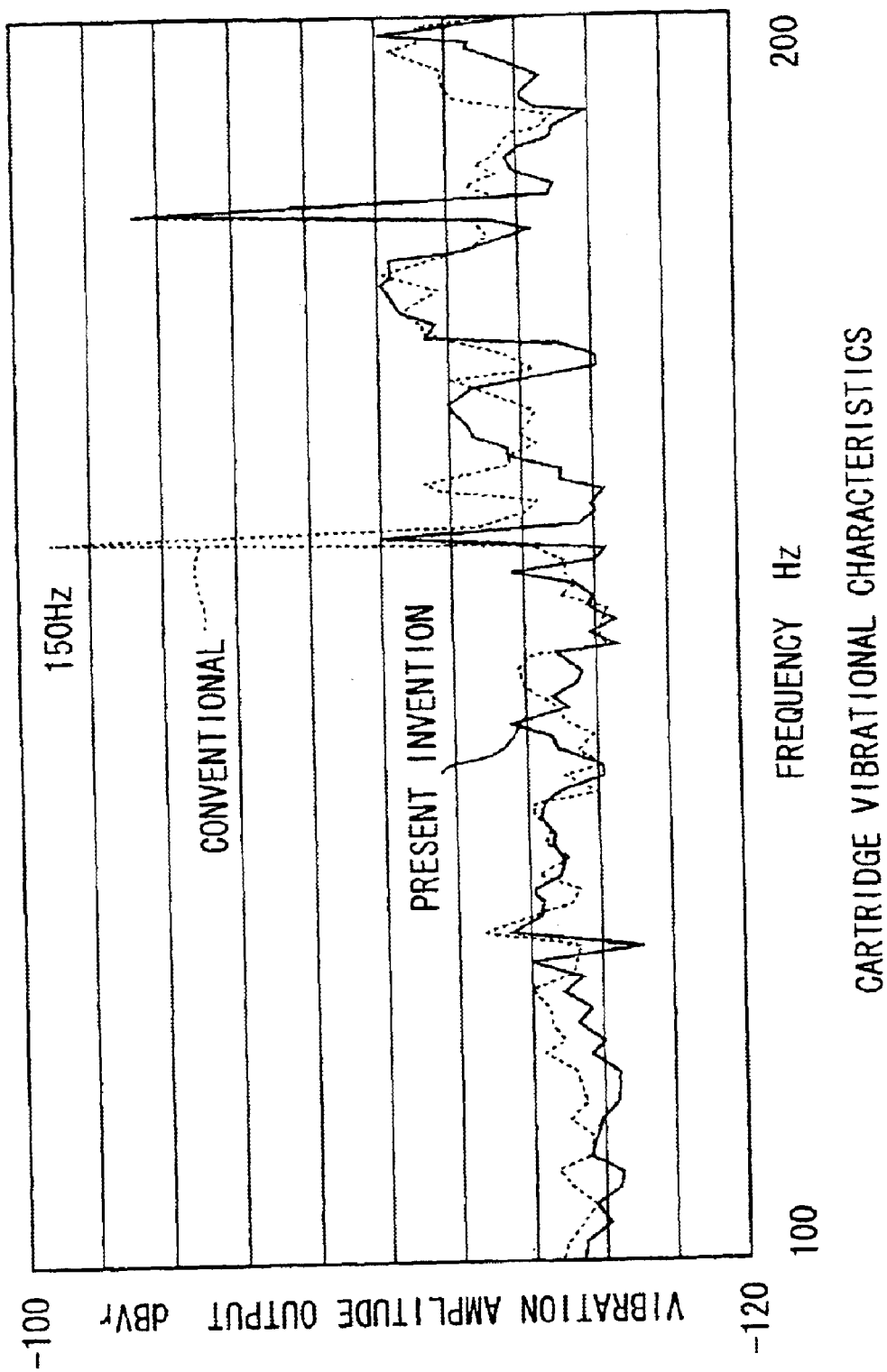
FIG. 4 is a diagram illustrating the vibrational characteristics of the cartridge body according to an embodiment of the present invention.

Next, vibrational characteristics of the disk cartridge 10 to which the printed layer 20 of the present invention is implemented were studied. With respect to the experiment method, a Laser Doppler Vibrometer was used, and the vibration of the cartridge body 13 when the disk cartridge 10 is inserted in a recording/reproducing apparatus and is put under playing conditions was measured. The portion that was measured was the center portion of the upper half 11. The results thereof are shown in FIG. 4 (solid line). The vertical axis is the output proportional to the vibration amplitude, and the horizontal axis is the frequency.

For comparison, the vibrational characteristics of a conventional disk cartridge (in the present example, only an ink layer in which neither resin particles nor writing-enabling fillers are contained) are indicated with a dotted line. In addition, in the experiment, the polyurethane particles C shown in table 1 were used for the resin particles 22. Further, the printed portions were, as shown in FIG. 1, the outer edge portions of the cartridge body 13 and approximately the center portion of the main surface 13a, and were the same for the conventional disk cartridge.

As is evident from FIG. 4, it can be seen that with the cartridge according to the present invention, vibration is attenuated compared to the conventional cartridge. In particular, the peak output at 150 Hz is greatly reduced (−110.1 dB) from the conventional value (−100.9 dB). As a result, it was found that the printed layer of the present invention may be used effectively not only as a printed layer for writing, but also as a vibration absorbing layer.

Modes for carrying out the present invention are explained above, but naturally, the present invention is not limited thereto, and various modifications based on the technical spirit of the present invention are possible.

Figure 5:
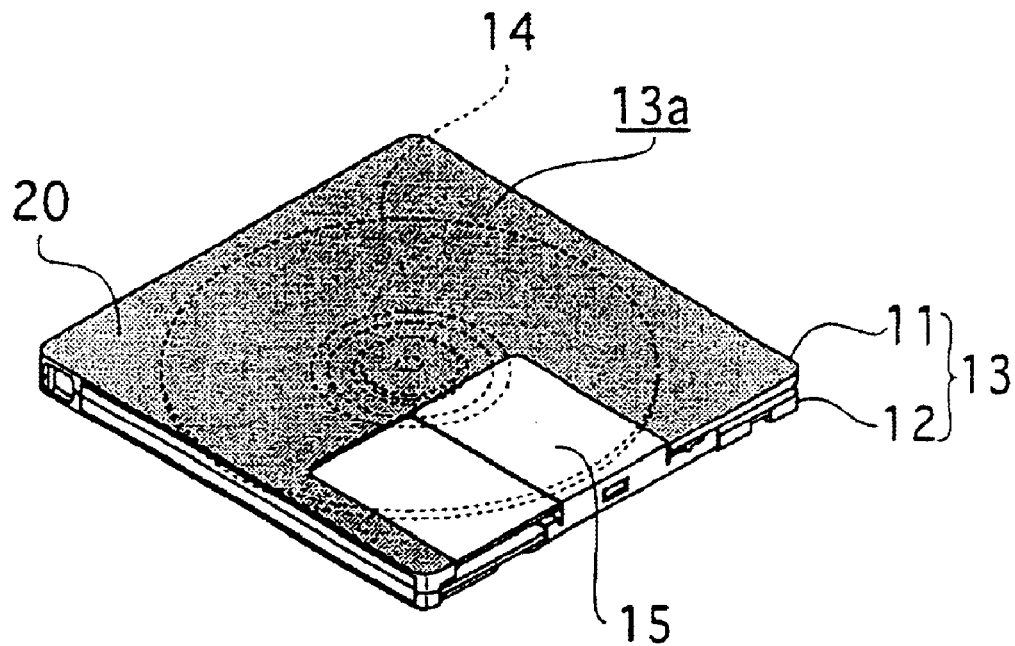
FIG. 5 is a perspective view illustrating an example of a modification of the configuration of the disk cartridge according to a mode of the present invention.
Figure 6:
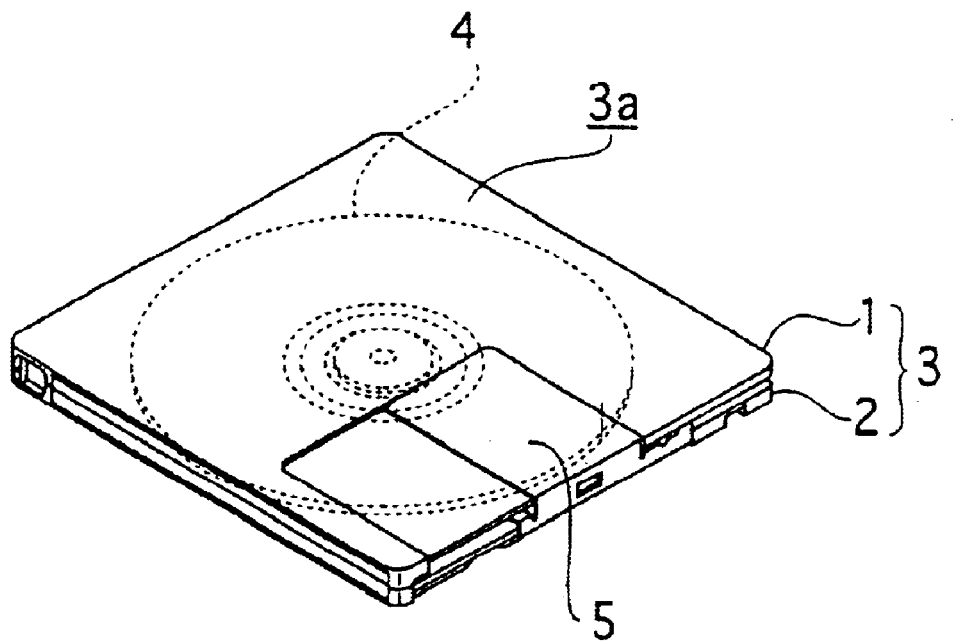
FIG. 6 is a perspective view illustrating one example of the configuration of a conventional disk cartridge.
Figure 7:
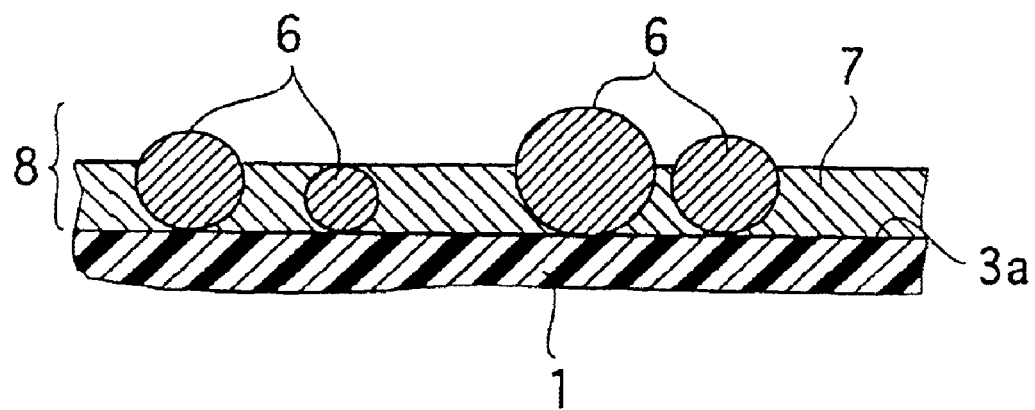
FIG. 7 is a sectional view illustrating in a simplified manner the configuration of a conventional printed layer.
Figure 8:
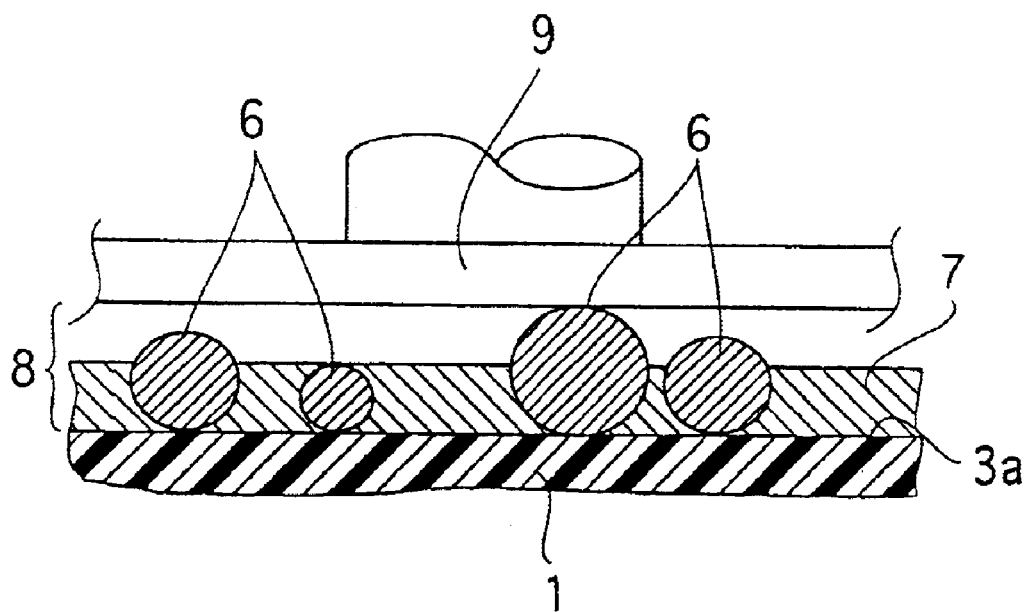
FIG. 8 is a diagram explaining the relationship between a conventional printed layer and a welding horn during ultrasonic welding.

For example, in the mode above, the printed layer 20 is formed on the outer edge portions and approximately the center portion of the main surface 13a of the cartridge body 13, however, it is not limited thereto, and as shown in FIG. 5, for example, the printed layer 20 may also be formed on the entire area of the main surface 13a.

In addition, an ink of a solvent type is used in the mode above, but UV curable resin may also be used as the medium. In this case, the blending ratio of the respective components is the same as in the case of the solvent type ink.

Further, in the mode above, an example where the present invention is applied to the disk cartridge of a MiniDisc™ (MD) is explained, but other than that, the present invention may be applied not only to flexible disks (FD), and cartridge type optical disks or magneto-optical disks, but also to tape form recording medium cartridges (cassettes).

As described above, according to the recording medium cartridge of the present invention, the effects (1)–(6) indicated below may be achieved.

(1) In constructing a cartridge body by ultrasonically welding upper and lower halves, a printed layer for writing formed on the main surface thereof does not become grazed and damaged, and a drop in aesthetic quality may be prevented.

(2) The printed layer mentioned above can be used effectively not only as a writing layer, but also as a vibration absorbing layer for the cartridge body, and functions of high-fidelity recording/reproducing can be secured.

(3) Damage to the printed layer during ultrasonic welding of the upper and lower halves may be prevented by suppressing the falling out and change in shape of a writing-enabling filler caused by ultrasonic vibration.

(4) Direct contact between the writing-enabling filler and a welding horn may be avoided, and damage to the printed layer during ultrasonic welding of the upper and lower halves may be prevented.

(5) Writability may be secured while preventing damage to the printed layer, and further, inferior adhesion with the base material may be suppressed.

(6) It can be made to function effectively not only as a writing layer, but also as a vibration absorbing layer.

What is claimed is:

1. In a recording medium cartridge comprising, on a main surface of a cartridge body having upper and lower halves in which a recording medium is housed, a printed layer containing a writing-enabling filler, wherein said recording medium cartridge is characterized in that said printed layer contains resin particles having an average particle diameter greater than or equal to the average particle diameter of said writing-enabling filler.

2. The recording medium cartridge according to claim 1, characterized in that said printed layer is formed as a vibration absorbing layer for suppressing vibrations of said cartridge body inside a recording/reproducing apparatus.

3. The recording medium cartridge according to claim 2, characterized in that the modulus of bending elasticity of said resin particles is 98 MPa or above and 980 MPa or below.

4. The recording medium cartridge according to claim 3, characterized in that the particle diameter of said resin particles is 20 $\mu$m or below.

5. The recording medium cartridge according to claim 3, characterized in that the amount of said resin particles contained is 3 weight parts or above and 10 weight parts or below.

6. The recording medium cartridge according to claim 2, characterized in that said printed layer is formed at least on an outer edge portion of the main surface of said cartridge body and on approximately a center portion of said main surface.

* * * * *